UNITED STATES PATENT OFFICE.

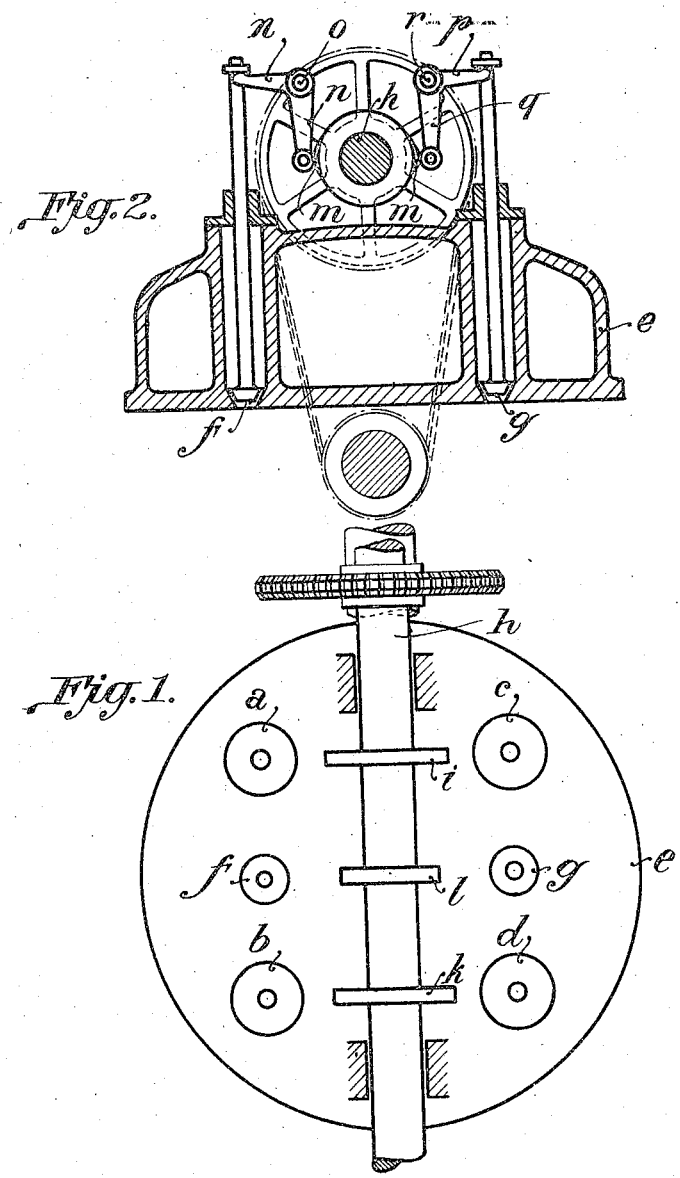

KARL FEILNER, OF NUREMBERG, GERMANY.

VALVE-GEAR FOR TWO-STAGE COMBUSTION-ENGINES.

1,061,681.　　Specification of Letters Patent.　Patented May 13, 1913.

Application filed November 26, 1910. Serial No. 594,252.

*To all whom it may concern:*

Be it known that I, KARL FEILNER, a citizen of the Empire of Germany, residing at Nuremberg, in the Empire of Germany, have invented a new and useful Valve-Gear for Two-Stage Combustion-Engines, of which the following is a specification.

Two-stage combustion engines running at a very high speed present the difficulty, that for cylinders of a size exceeding a certain limit it is no longer possible to obtain a good sweeping or cleaning of the cylinder with fresh air by means of a single air valve, so that several air valves require to be employed.

My invention relates to a very simple valve gear for operating several air valves and hydrocarbon valves. A cam disk shaft is so disposed and driven from the crankshaft as to make only half the number of revolutions as the crankshaft. The valves of the same kind are disposed in pairs on both sides of the cam disk shaft and the several cam disks adapted to each operate one pair of valves are each given two opposite cams, so that each valve is actuated by one cam during one revolution of the crankshaft and by the other cam during the following revolution of the crankshaft. Thus the new valve gear is not only very simple, but also presents the advantage, that the speed of the cam disk shaft is reduced to half that of the crankshaft, so that the work of the rapidly running engine is very favorably influenced, since the valves are more softly actuated.

I will now proceed to describe my invention with reference to the accompanying drawing, in which—

Figure 1 is a top view of a cylinder cover provided with four air valves and two hydrocarbon valves and also with a cam disk shaft carrying cam disks for actuating the valves, and Fig. 2 is a vertical central section through the same.

Similar letters of reference refer to similar parts in both views.

*e* denotes a cylinder cover of any known construction for a vertical two-stage combustion engine. In this cover *e* four air valves *a, b, c, d* and two hydrocarbon valves *f, g* of any known construction are disposed in pairs in parallel vertical planes at right angles to a cam disk shaft *h*, which is for example disposed above the cover *e* in its vertical central plane. It is to be noted, that the valves in each pair are to be of the same kind. The cam disk shaft *h* is in any known manner so driven from the crankshaft as to make only half the number of revolutions of the latter. It carries three cam disks *i, k* and *l*, which are each provided with two opposite cams, so that the two valves in each pair are simultaneously opened and closed by the respective cam disk. For example the middle cam disk *l* has two opposite cams *m, m* (Fig. 2) and it will be seen, that the two hydrocarbon valves *f* and *g* can be simultaneously opened from the two cams *m, m* by means of suitable bell-crank levers *n n* and *p q* rocking at *o* and *r* respectively. Either valve, say *f*, will be actuated by one cam *m* during one revolution of the crankshaft and by the other cam *m* during the following revolution. In a similar manner the two air valves *a* and *c* in the same vertical plane will be simultaneously opened and closed and each alternately actuated by the two cams on the cam disk *i*. The two other air valves *b* and *d* will be simultaneously opened and closed and each alternately actuated by the two cams on the cam disk *k*. Of course the two valves in each pair require to be disposed on both sides of the cam disk shaft *h*. They are shown to be symmetrically disposed with regard to the cam disk shaft *h*. If necessary, the latter will have to be disposed on one side of the central line of the cover, in case a piston rod passes through the cover *e*.

Obviously the cover *e* will require to be placed vertically for a horizontal two-stage combustion engine.

I claim:

In a two-stage combustion engine, the combination with a cylinder cover, of a cam disk shaft disposed near said cover at right angles to its axis and adapted to be driven at half the speed of the crankshaft, even numbers of air valves disposed in pairs in said cover in parallel planes at right angles to and on both sides of said cam disk shaft, even numbers of hydrocarbon valves similarly disposed in said cover, cam disks on said cam disk shaft having each two opposite cams for simultaneously actuating the two valves of the corresponding pair, and means for transmitting the motion from said cam disks to said air valves and hydrocarbon valves respectively.

KARL FEILNER.

Witnesses:
P. GOETZ,
RALPH W. DOX.